United States Patent [19]

Biggs, Jr.

[11] 3,979,071
[45] Sept. 7, 1976

[54] APPARATUS FOR BROADCASTING GRANULAR MATERIAL

[76] Inventor: Charles L. Biggs, Jr., 2309 Regal Road, Plano, Tex. 75074

[22] Filed: Dec. 15, 1975

[21] Appl. No.: 640,437

[52] U.S. Cl. ............................... 239/653; 239/676; 239/686; 239/687
[51] Int. Cl.² ......................................... A01C 17/00
[58] Field of Search ........... 239/653, 668, 669, 676, 239/679, 686, 687, 650

[56] References Cited
UNITED STATES PATENTS

| 486,388 | 11/1892 | Strong | 239/686 X |
|---|---|---|---|
| 3,096,984 | 7/1963 | Garrison | 239/686 X |
| 3,157,402 | 11/1964 | Love | 239/686 |
| 3,227,461 | 1/1966 | Love | 239/686 |

Primary Examiner—Robert S. Ward, Jr.
Attorney, Agent, or Firm—H. Mathews Garland

[57] ABSTRACT

A portable hand held device for distributing granular material including a hopper for holding the material, a support base for the hopper, a distributor wheel having circumferentially spaced outwardly opening compartments suspended beneath the base under the discharge of the hopper, a hand crank operated drive assembly mounted on the base coupled with the distributor wheel turning the wheel, an arcuate shield or side wall suspended from the base around the portion of the distributor wheel in the vicinity of the discharge of the hopper into the wheel, and a shutter slide mounted between the distributor wheel and the hopper discharge for adjusting the rate of flow from the hopper into each compartment of the distributor wheel. Granulated materials such as fertilizer, insecticide, grass seed, and the like is distributed by manual support of the device and rotation of the handle to broadcast the material as the distributor wheel is rotated and the material is fed from the hopper through the shutter into the individual compartments of the wheel. The complete isolation of each compartment from the other eliminates the need for a closure plate so that when distribution is stopped the material ceases to flow.

14 Claims, 10 Drawing Figures

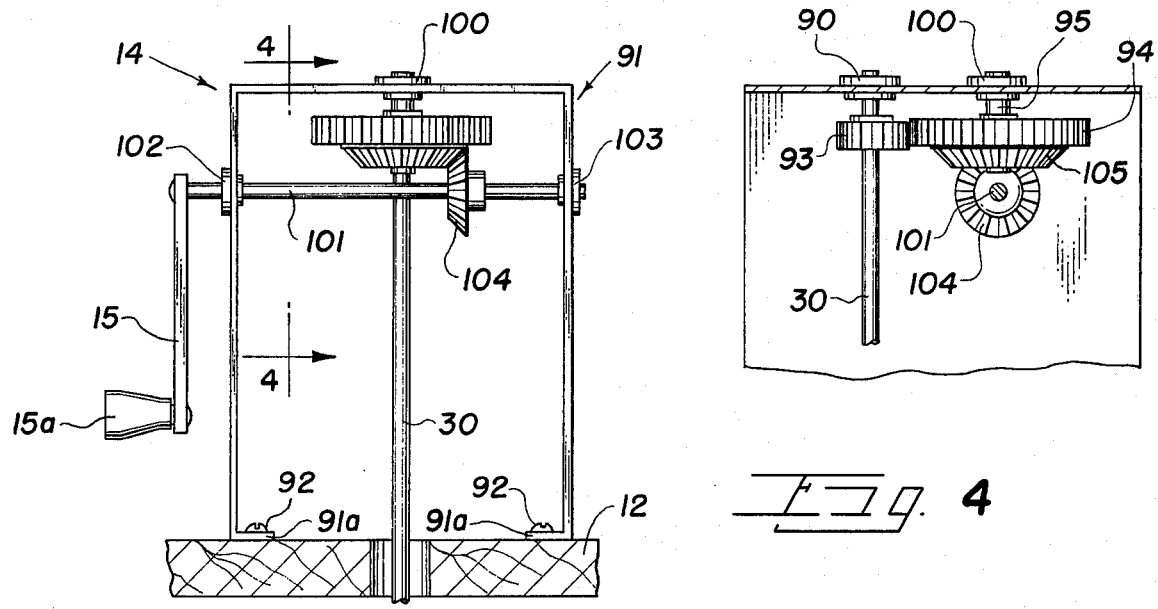
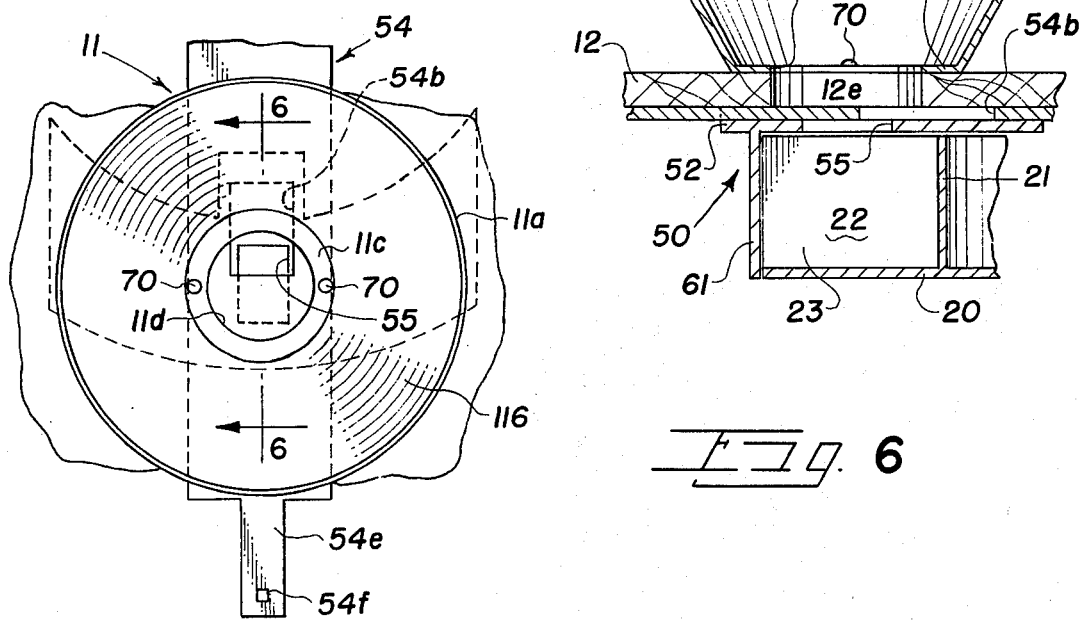

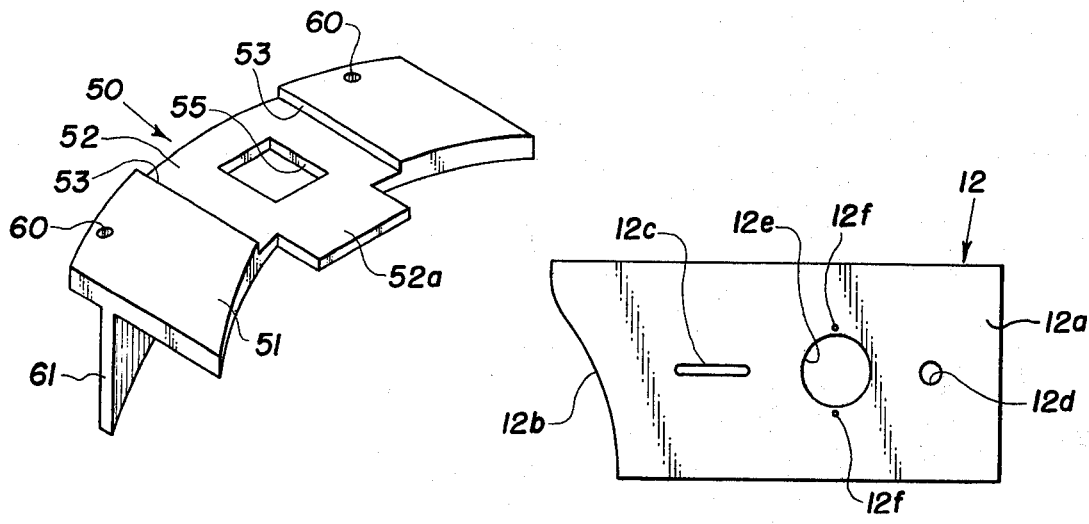
Fig. 7
Fig. 8
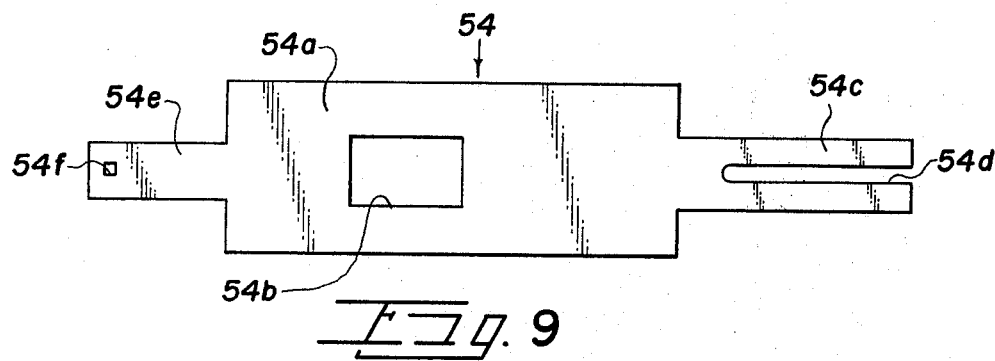
Fig. 9
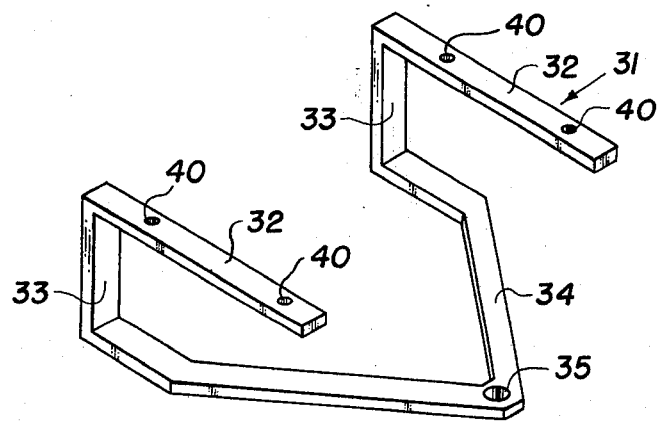
Fig. 10

APPARATUS FOR BROADCASTING GRANULAR MATERIAL

This invention relates to distributing devices and more particularly relates to broadcasting apparatus for distributing granulated materials such as fertilizers, grass seeds, insecticides, and the like.

A number of devices have been developed for the distribution of various types of fertilizers, insecticides, grass seeds, and the like utilizing a turbine type distributor. Such devices, however, generally operate on the principle of effectively blowing the material by means of an air stream so that the area over which the material is distributed is not easily controlled. If any wind is blowing, a particular problem is presented in limiting the material to the desired locations. While other forms of distributing apparatus have been available, they generally use a metering system having discharge openings to the distributor wheel which must be closed at times when distribution of the material is not desired. Otherwise, in this latter form of apparatus, the material will continue to flow when the operator stops moving over the area being treated so that an excessively high concentration of the material and ineffecient loss occurs in one spot.

It is a particular object of the invention to provide a new and improved form of distribution apparatus for broadcasting fertilizers, grass seeds, insecticides, and the like.

It is another object of the invention to provide distribution apparatus for granulated materials which permits application of the material to a treated area in a limited, controlled manner.

It is another object of the invention to provide granulated material distribution apparatus which may be used in a number of different applications including portable hand held devices.

It is another object of the invention to provide material distributing apparatus which does not require a positive shutoff member to stop flow of the material during use of the device.

It is another object of the invention to provide a distributing device for granulated material which utilizes a distributor wheel having separate independent circumferential compartments which are sequentially fed from a hopper through a metering plate assembly.

It is another object of the invention to provide a device of the character described in which the discharge flow rate automatically decreases with decreased distributor wheel speed.

It is another object of the invention to provide a granulated material distributing device which has a minimum number of parts thereby reducing manufacturing and assembly costs.

In accordance with the invention there is provided a distributing apparatus for broadcasting granulated materials such as fertilizers, grass seeds, insecticides, and the like which comprises a storage hopper having a discharge opening at the lower end thereof, a base plate supporting the storage hopper, a distributor wheel suspended from the base plate below the storage hopper having circumferentially spaced individual outwardly opening compartments each adapted to sequentially move below the discharge opening of the storage hopper, an arcuate wall suspended from the base plate bounding the distributor wheel extending to opposite sides of the opening from the hopper into the distributor wheel compartments for confining the granulated material in the compartments during the filling step, a shutter plate between the distributor wheel and the opening into the hopper to adjust the flow rate from the hopper into the distributor wheel, a drive system having a hand crank and coupled with the distributor wheel for rotating the wheel to broadcast the granulated material, and means for an operator to hold the device while walking over an area to be treated.

The foregoing objects and advantages of the invention together with the details of a specific embodiment thereof will be better understood from the following description of a preferred form of the invention taken in conjunction with the accompanying drawings wherein:

FIG. 3 is an enlarged fragmentary view in section and elevation taken along the line 3—3 of FIG. 1;

FIG. 4 is a fragmentary view in section and elevation taken along the line 4—4 of FIG. 3;

FIG. 5 is a fragmentary top plan view showing the relationship of the shutter slide and the opening from the hopper into the distributor wheel together with related parts of the device;

FIG. 6 is a side fragmentary view in section taken along the line 6—6 of FIG. 5;

FIG. 7 is a view in perspective of the integral side wall member and hopper discharge opening plate;

FIG. 8 is a reduced top plan view of the base of the device on which the hopper is mounted and from which the distributor wheel and related parts are supported;

FIG. 9 is a top plan view of the shutter slide for controlling flow rate; and

FIG. 10 is a view in perspective of the support frame for the distributor wheel and related parts suspended below the base.

Figure 1:
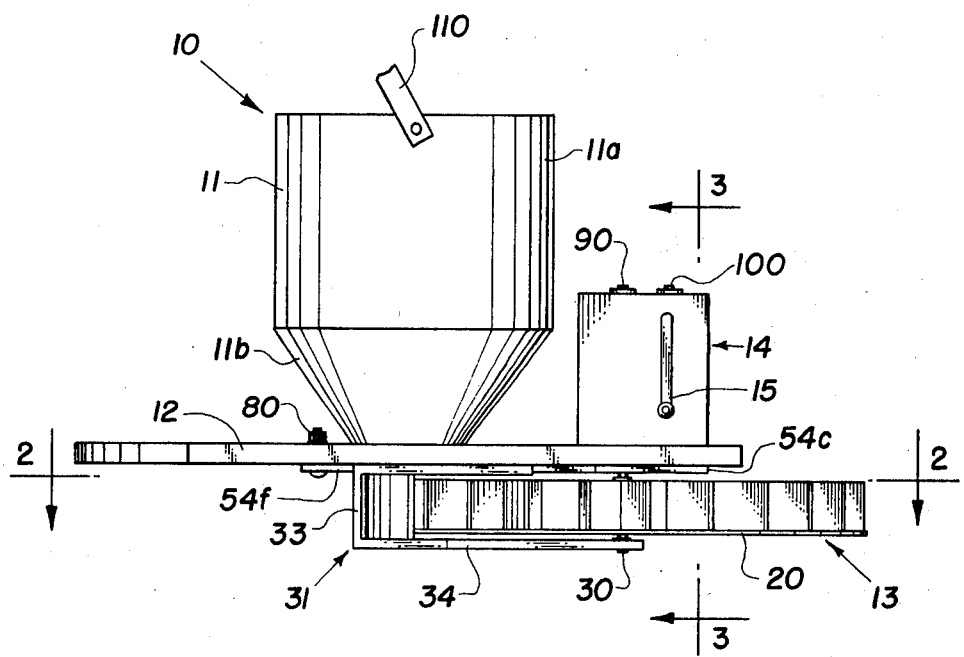
FIG. 1 is a side view in elevation of a hand held form of material distributor embodying the features of the invention.

Referring to FIG. 1 of the drawings, a distributor device 10 incorporating the features of the invention includes a hopper 11 mounted on a base 12 for discharge into peripheral compartments of a distributor wheel 13 rotatably suspended from the base. A drive system 14 is supported on the base and mechanically coupled with the distributor wheel for rotating the wheel to discharge granulated material from the wheel for broadcasting the material over a desired area. The drive system is hand operated by means of a crank 15 which rotates the distributor wheel in a counterclockwise direction as viewed in FIG. 2 for casting the granulated material outwardly from the wheel compartments.

Figure 2:
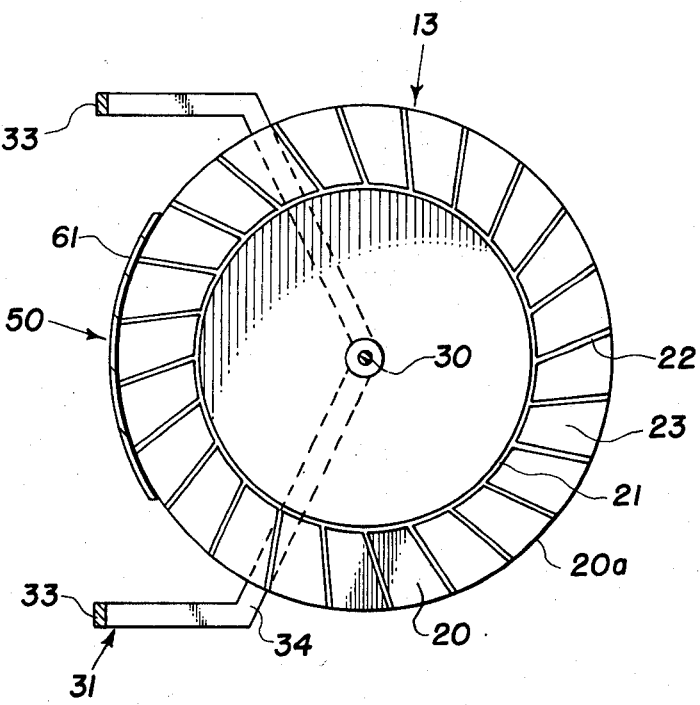
FIG. 2 is a view in section taken along the line 2—2 of FIG. 1.

Referring to FIGS. 1 and 2, the distributor wheel 13 has a round bottom plate 20 on which a cylindrical inside wall member 21 is mounted perpendicular to the top face of the plate 20 to define the inside of the material compartments of the wheel. A plurality of wall dividers 22 are mounted on the plate perpendicular to the top face of the plate extending from the outside face of the wall 21 to the outer peripheral edge 20a of the base 20. The wall dividers are spaced circumferentially around the plate 20 defining a plurality of outwardly opening material compartments 23 which receive and hold the material to be distributed until it is cast outwardly from the wheel. Each of the wall dividers 22 is a rectangular member as seen in FIG. 6. As evident in FIG. 2, each of the dividers 22 slopes in the direction of rotation of the distributor wheel and, thus, is aligned at an angle with a tangent line, not shown, drawn at the base of the divider to the circular inner wall 21. The slope of the dividers 22 aids in the broadcasting action of the distributor wheel as the wheel rotates. As is evident from FIGS. 2 and 6, the top and outer or peripheral end of each of the compartments 23 is open to allow granulated material to be supplied to the compartments from above out of the hopper and for the material to be cast outwardly from the outer ends of the compartments.

The distributor wheel 13 is rotatably suspended on a shaft 30 beneath the base 12 by a support frame 31. The frame 31 has horizontal upper arms 32, vertical portions 33, and a lower V-shaped wheel support portion 34. At the apex of the frame portion 34 is a shaft opening 35 which receives the lower end portion of the wheel shaft 30. The upper arms 32 are parallel with each other and spaced apart as evident in FIG. 10 and each of the arms has a pair of spaced bolt holes 40 to receive screws or bolts, not shown, extending into the lower face of the base 12 for securing the frame 31 with the bottom surface of the base to suspend the distributor wheel 13 below the base. As evident in FIGS. 1 and 6, the distributor wheel 13 is supported in closely spaced relation below the base 12. A member 50 shown in detail in FIG. 7 is secured between the distributor wheel and the bottom face of the base 12. Member 50 has a top circular segment portion 51 which is of slightly greater width than the horizontal depth of the compartments 23 and of sufficient length to overlap on either side of the passages defined between the hopper 11 and the material receiving compartments 23 of the distributor wheel. The upper portion 51 of the member 50 has a central section 52 provided with a top recess portion defined between spaced parallel shoulders 53 which receives a flow control aperture slide 54 which is shown in detail in FIG. 9. The central portion 52 of the member 50 has a square opening 55 through which granulated material flows from the hopper 11 into the compartments 23 of the distributor wheel 13. An extension or tongue portion 52a of the central portion of the member 50 is formed on the member to protect against spillage at certain positions of the slide 54. The upper portion 51 of the member 50 has spaced holes 60 for securing the member to the bottom face of the base 12 with screws or bolts, not shown. The member 50 also has a skirt or wall portion 61 which is an arcuate cylindrical member formed integral with the top portion 51 of the member 50. The skirt 61 is formed on a radius which is very slightly larger than the radius of the distributor wheel 13 so that the skirt may be so closely spaced from the outer periphery of the wheel 13 as shown in FIG. 6 to prevent leakage from the wheel compartments 23 confining the granulated material within the compartment until each compartment turns to the proper position for discharge of the material from the compartment. In the particular design configuration shown, it will be seen in FIG. 2 that the skirt portion 61 extends around slightly more than four of the compartments 23 though it will be understood that the length of the skirt may be increased or decreased as desired depending upon the operating conditions of the device. The skirt must be long enough to retain the material within the compartments until the compartments rotate to the desired location for discharge of the material.

The flow control slide 54 as shown in FIG. 9 has a central rectangular section 54a provided with a rectangular opening 54b, a forked or bifurcated portion 54c having an endwardly opening slot 54d, and an opposite reduced end portion 54e provided with a bolt opening 54f.

The base 12 has a square outer end portion 12a and a curved end edge 12b designed to conform to a portion of the body of the operator of the device near the waist level. The base 12 has a slot 12c located near the end edge 12b used in securing the flow control slide 54 along the bottom face of the base as discussed hereinafter. Near the end 12a of the base a hole 12d is provided for the shaft 30 supporting the distributor wheel 13. A circular opening 12e is provided in the base between the slot 12c and the hole 12d for discharge of granulated material from the hopper 11 into the distributor wheel. Identical holes 12f are positioned through the base on opposite sides of the opening 12e for securing the hopper 11 with the base.

As shown in FIGS. 1, 5, and 6, the hopper 11 has an upper cylindrical portion 11a and a lower conical discharge portion 11b terminating in an inwardly turned annular flange 11c. The flange 11c defines a circular discharge opening 11d from the bottom end of the hopper. The flange is provided with spaced holes, not shown, which register with the holes 12f in the base 12 for securing the hopper on the base by means of a pair of bolts 70 which extend through the flange 11c into the base 12.

As previously stated the distributor wheel 13 is suspended on the shaft 30 below the base 12. The member 50 is secured on the bottom face of the base 12 with the top plate portion 51 of the member 50 extending along the bottom face of the base 12 between the top of the distributor wheel and the base so that the portion 51 extends around and over a section of the distributor wheel 13 along slightly in excess of four of the compartments 23. As evident in FIG. 6, the discharge opening 55 through the portion 51 of the member 50 is substantially centered with the discharge opening 12e through the base 12. The flow control slide 54 is disposed through the recess 52 of the member 50 between the recess edges 53 extending lengthwise of the base 12 so that the bifurcated end portion 54c of the flow control slide is fitted around the shaft 30 with the shaft passing through the slot 54d of the slide. The other end portion 54e of the flow control slide is secured with the bottom face of the base 12 by a bolt assembly 80, FIG. 1, which passes through the opening 54f of the flow control slide and the slot 12c in the base 12. Since the slide is provided with a slot 54d around the shaft 30 and the base is provided with a slot 12c, the flow control slide is adjustable longitudinally for changing the position of the flow control opening 54b of the slide relative to the opening 55 in the member 50 leading into the distributor wheel compartment 23 immediately below the opening 55 as seen in FIG. 6. Adjustment of the position of the flow control slide to vary the overlapping relationship between the opening 55 and the slide flow control opening 54b controls the size of the flow passage into the distributor wheel compartments from the hopper. It will be apparent from FIGS. 5 and 6 that the maximum flow rate is obtained when the slide is positioned to substantially center the slide opening 54b over the opening 55 so that the full size of the opening 55 is available for material flow. In the particular position of the slide 54 as represented in FIGS. 5 and 6 there is a staggered relationship between the slide opening 54b and the opening 55 which reduces the flow rate to approximately one-third of the maximum available flow rate. The plate portion 52a of the member 50 fits in closely spaced overlapping relationship with the opening 54b as seen in FIG. 6 to prevent leakage of granulated material from the opening 54b when it is misaligned from the opening 55 as seen in FIG. 6.

Referring to FIGS. 3 and 4, the distributor wheel drive system 14 includes the drive shaft 30 which is mounted along an upper end portion in a bearing assembly 90 supported through a top horizontal panel of an inverted U-shaped bracket 91 which forms an open ended housing for the drive system. The bracket 91 has inwardly turned lower end flanges 91a secured by screws 92 to the top face of the base 12. A pinion gear 93 is mounted on the shaft 30 for driving the shaft to turn the distributor wheel. The pinion gear 93 meshes with a ring gear 94 supported on a shaft 95 suspended from a bearing 100 mounted in the top of the bracket 91 spaced from the bearing 90. The handle 15 is mounted on a horizontal shaft 101 supported through bearings 102 and 103 mounted in the opposite sides of the bracket 91 as seen in FIG. 3. A knob 15a is secured on the end of the handle 15 for turning the handle. A beveled pinion gear 104 on the handle shaft 101 meshes with another beveled gear 105 mounted on the shaft 95 below the ring gear 94. The ring gear 94 and the beveled gear 105 are both secured together so that turning the beveled gear drives the ring gear. Rotation of the shaft 101 by means of the handle 15 turns the beveled pinion gear 104. The gear 104 drives the beveled gear 105 which turns the ring gear 94. The ring gear 94 drives the pinion gear 93 on the shaft 30 which rotates the distributor wheel 13. The direction of rotation of the distributor wheel, of course, depends upon the direction the handle 15 is turned by the operator of the device.

The spreading device 10 may be used in a number of different ways. It may be hand held, shoulder supported, carriage mounted, tractor mounted, and such other applications as truck mounted. In the particular form shown the device is provided with a shoulder strap 110 shown in fragmentary form in FIG. 1 so that the operator may suspend the device from his shoulder while resting the inward edge 12b of the base 12 approximately at his waist so that the device is held steady by the left hand applied along the outer portion of the left edge of the base 12, the upper edge as seen in FIG. 8, while the right hand will grasp the knob 15a for turning the distributor wheel 13.

In the operation of the device 10 supported from the shoulder of the operator as discussed above, the hopper 11 is filled with the desired amount of the granulated material to be distributed. Prior to placing the material in the hopper, however, the flow control slide 54 is adjusted by loosening the bolt assembly 80 to position the flow opening 54b in the slide in a relationship with the opening 55 in the member 50 as can be understood from FIG. 5 to provide the desired flow from the hopper into the distributor wheel 13. This adjustment is an empirical step based upon a number of experience factors such as the pace at which the operator walks, the rate at which the operator turns the distributor wheel 13, the nature of the material being distributed, and other obvious variables relating to the operation of the device. With the desired quantity of material in the hopper 11, the operator walks over the area to be treated while turning the crank 15 to rotate the distributor wheel 13. The granulated material flows from the hopper downwardly through the opening 11d in the flange 11c in the lower end of the hopper, through the opening 12e in the base 12, and through the openings 54b and 55 in the flow rate control slide and the member 50 respectively. The material drops into each compartment 23 of the distributor wheel as the compartment passes beneath the flow opening 55. The quantity of the material which will enter each compartment depends upon the rate of rotation of the distributor wheel and the size of the opening provided at the particular adjustment of the flow control slide relative to the member 50. Since the divider walls 22 extend to the outer edge of the wheel 13 and the arcuate skirt 61 is closely spaced from the wheel edge, the granulated material flows into each of the wheel compartments 23 and is confined therein until the compartment passes as the wheel rotates beyond an end edge of the skirt 61. As each compartment leaves the confinement of the skirt, the open outward end of the compartment, as evident in FIGS. 1 and 2, allows the granulated material to spill outwardly from the compartment to the surface being treated. The rotation of the distributor wheel imposes a centrifugal force on the granulated material causing it to be thrown outwardly in a generally circular pattern depending upon the operating conditions of the device. It will be apparent that as the distributor wheel rotates, there will be a short time during which two compartments of the wheel will be filling simultaneously. This occurs as one compartment rotates away from the communicating openings 54b and 55 and the other compartment enters beneath the openings. The opening 55 is sized relative to the compartments 23 and the compartment dividers 22 are positioned at an angle which will permit only two compartments to ever be filling at the same time as the distributor wheel rotates. Also the skirt 61 is of a length and so positioned that it will always be covering the open outer ends of the compartments 23 during the time that the compartments are filling. Thus, the skirt 61 must be at least longer than the combined lengths of the outer ends of at least two of the compartments 23 measured in such a way that the advancing compartment will still be covered at the outer end as the last portion of the compartment is being filled with the granulated material. Another factor in determining the length of the skirt 61 is that the granulated material should not be thrown back on the operator and, thus, preferably the skirt will encompass at least about four or more of the distributor wheel compartments depending, of course, upon the size of the compartments and other dimensional factors. Since the skirt will at all times be covering the outer ends of the compartments as the compartments fill, and the skirt is very closely spaced to the distributor wheel edge, the material is confined in the compartments until the wheel is rotated far enough to spill the material outwardly in a desired manner. Thus, there is no need to use a closure member to shut off flow of the granulated material from the hopper as in the case of many similar distributors. At any position at which the distributor wheel 13 is stopped no more than two of the compartments 23 can fill and when they are filled the material can no longer flow to the wheel and, thus, an extra member in the form of a closure is not necessary in the device.

It will now be seen that a new and improved material distributor for spreading fertilizer, grass seed, insecticides, and other granulated material for treating a desired area has been described and illustrated. The structural and functional advantages over the prior art will be apparent from the drawings and the description including such features as minimum parts, no requirement for a special shutoff system, a variable flow rate within the control of the operator, and other structural and functional advantages.

I claim:

1. A spreader device for broadcasting substantially granular material comprising: hopper means for holding said material, said hopper having a discharge opening in a bottom end thereof; a distributor wheel rotatably secured below said hopper, said wheel being provided with a plurality of outwardly opening compartments spaced around the periphery thereof; skirt means around a portion of said wheel closing the outward open ends of a portion of said wheel compartments as said compartments are filled with said granular material from said hopper; said wheel compartments being closed to discharge flow of said material therefrom while said compartments are in communication with said hopper; and means for rotating said distributor wheel.

2. A spreader device in accordance with claim 1 including means for varying the flow rate of said granular material from said hopper into said distributor wheel compartments.

3. A distributor device in accordance with claim 2 wherein said distributor wheel compartments are defined by radially extending circumferentially spaced dividers.

4. A spreader device in accordance with claim 3 wherein said means for rotating said distributor wheel comprises a hand crank secured with a gear assembly coupled with said wheel.

5. A spreader device in accordance with claim 4 wherein said hopper and said drive means are supported on a base plate and said distributor wheel and said skirt are suspended below said base plate.

6. A spreader device in accordance with claim 5 wherein said distributor wheel includes a cylindrical inner wall member defining inward ends of each of said compartments.

7. A spreader device in accordance with claim 6 wherein said skirt is an arcuate member extending around said distributor wheel covering the outward ends of that portion of said wheel compartments being filled with said granular material as said distributor wheel turns.

8. A spreader device in accordance with claim 7 wherein no more than two of said wheel compartments are filled simultaneously from said hopper.

9. A spreader device in accordance with claim 8 wherein said skirt encircles more than said two of said compartments being filled from said hopper.

10. A spreader device for broadcasting substantially granular material comprising: a hopper for containing said material, said hopper having a discharge opening in the bottom end thereof; a base secured with a lower end portion of said hopper supporting said hopper, said base having an opening communicating with said bottom opening of said hopper; a distributor wheel secured below said base, said distributor wheel having a plurality of granulated material compartments arranged in an annular configuration around the outer periphery of said wheel each opening radially outwardly from said wheel, said compartments being isolated from each other and each communicating with said hopper when said wheel is at a position of rotation at which each said compartment is below said bottom opening of said hopper; an arcuate skirt suspended from the bottom face of said base around a portion of said material compartments of said wheel closing the outward open ends of a portion of said compartments while said portion of said compartments are filling with material from said hopper as said wheel rotates; a flow control slide movably secured with the bottom face of said base between said base and said wheel, said slide having a flow opening cooperating with said opening from said hopper and movable relative thereto for adjusting the flow rate from said hopper into said wheel compartments; a shaft secured with and rotatably supporting said wheel, said shaft extending above the top face of said base; a gear assembly coupled with said shaft for turning said shaft to rotate said wheel; and a hand crank connected with said gear assembly for driving said gear assembly to manually rotate said wheel.

11. A device in accordance with claim 10 wherein said wheel compartments are defined by a plurality of radially extending circumferentially spaced dividers secured in said wheel, the outward end edges of said dividers moving in closely spaced relation with said arcuate skirt to close off flow of said granulated material from the outward ends of said compartments as said compartments move along the inner face of said skirt while filling with said granulated material.

12. A device in accordance with claim 11 wherein said wheel includes an inner annular wall secured with inner end edges of each of said dividers defining the inward ends of said material compartments.

13. A device in accordance with claim 12 wherein said dividers each slope relative to a radius line drawn to each of said dividers in the direction of rotation of said wheel.

14. A device in accordance with claim 13 including a plate member formed integral with said skirt secured with the bottom face of said base having a recess in the top face thereof and a flow opening communicating with said opening in said flow control slide whereby said slide is supported by said plate for adjustment of said opening and said slide with said opening and said plate to control the rate of flow from said hopper into said wheel compartments.

* * * * *